UNITED STATES PATENT OFFICE.

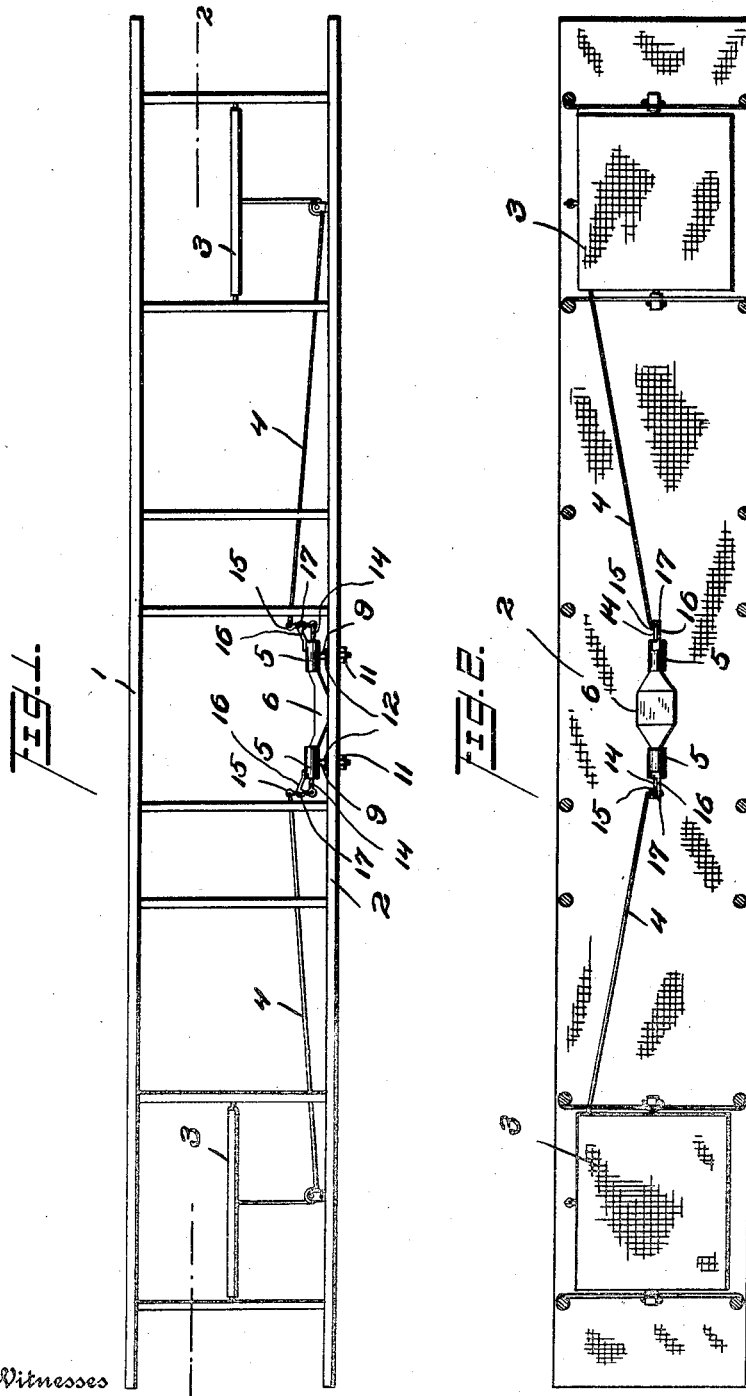

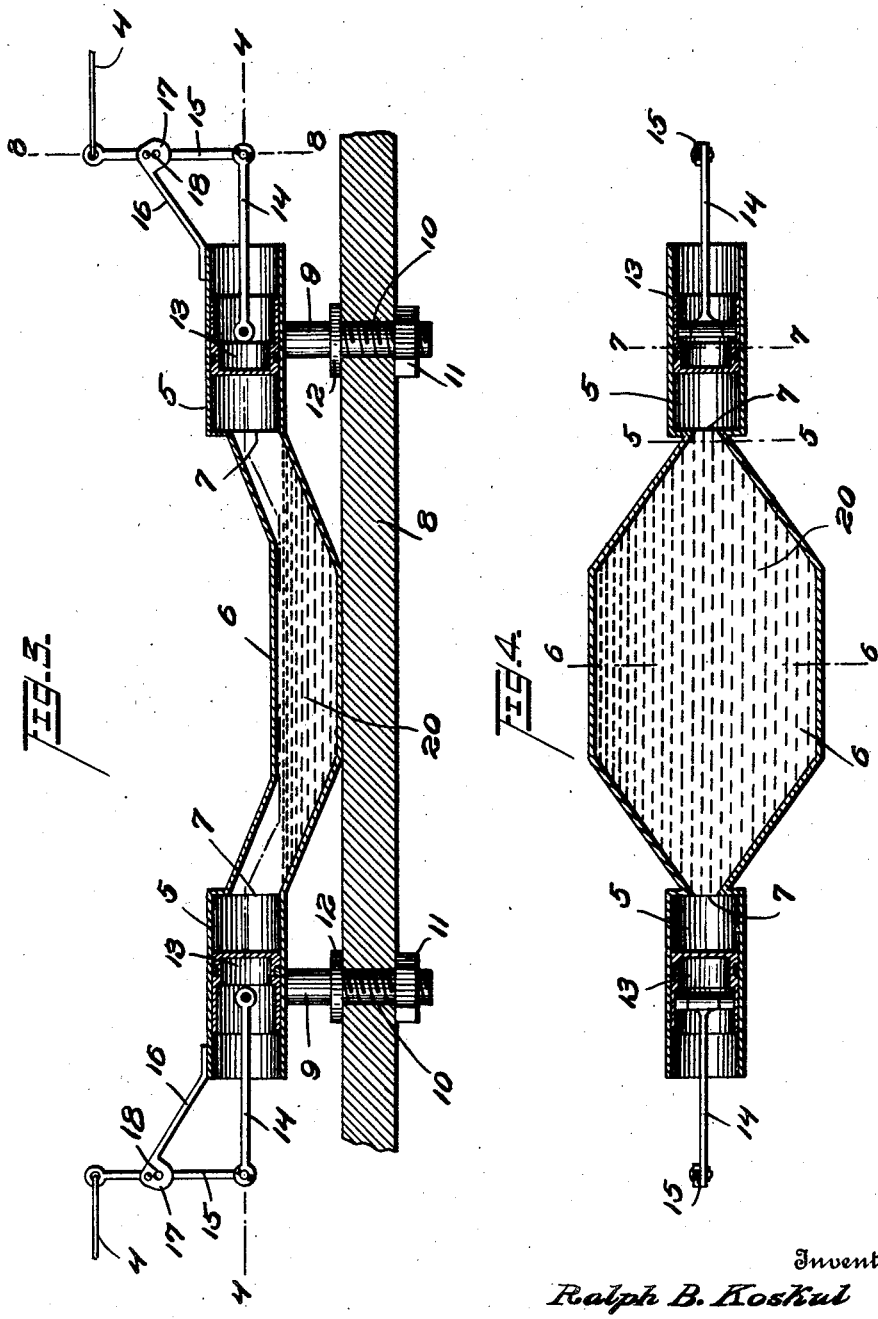

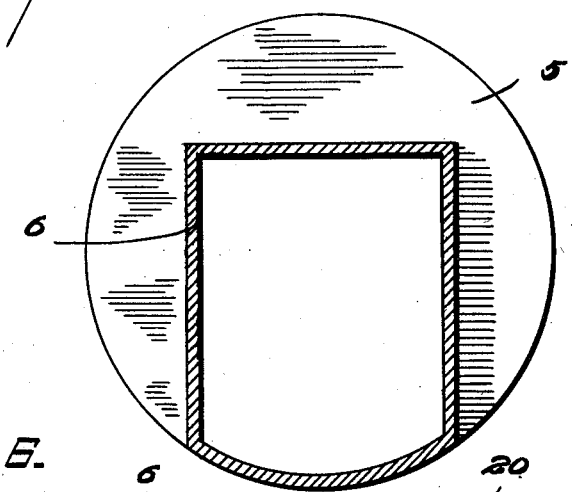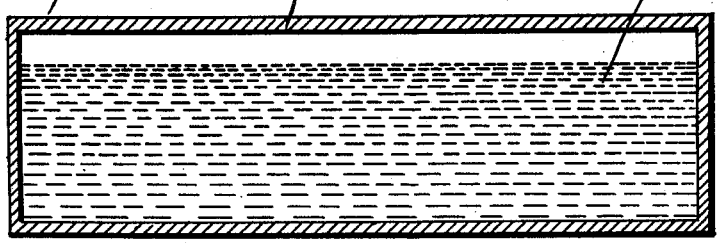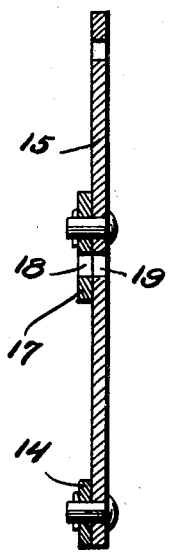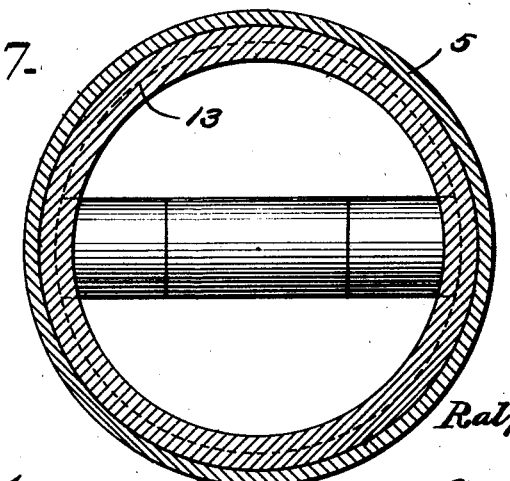

RALPH B. KOSKUL, OF PHILADELPHIA, PENNSYLVANIA.

AUTOMATIC STABILIZING MECHANISM.

1,047,247.   Specification of Letters Patent.   Patented Dec. 17, 1912.

Application filed March 19, 1912. Serial No. 684,702.

*To all whom it may concern:*

Be it known that I, RALPH B. KOSKUL, a citizen of the United States, residing at Philadelphia, in the county of Philadelphia and State of Pennsylvania, have invented certain new and useful Improvements in Automatic Stabilizing Mechanism, of which the following is a specification.

My invention relates to improvements in automatic stabilizing mechanism for aeroplanes, and more particularly to an improved mercurial device in which the specific gravity of the mercury is utilized to move equilibrium planes such as ailerons to automatically bring the aeroplane to an even keel when the latter tilts to right or left.

A further object is to provide a mechanism of this character which may be utilized in connection with any of the well known types of aeroplanes in use.

With these and other objects in view, the invention consists in certain novel features of construction and combinations and arrangements of parts, as will be more fully hereinafter described and pointed out in the claims.

In the accompanying drawings: Figure 1, is a view in front elevation illustrating an aeroplane of the biplane type showing my improvements in operative position. Fig. 2, is a view in section on the line 2—2 of Fig. 1. Fig. 3, is a view in longitudinal section through my improved stabilizer. Fig. 4, is a view in section on the line 4—4 of Fig. 3. Fig. 5, is a view in section on an enlarged scale on the line 5—5 of Fig. 4. Fig. 6, is a view in section on an enlarged scale on the line 6—6 of Fig. 4. Fig. 7, is a view in section on an enlarged scale on the line 7—7 of Fig. 4, and Fig. 8, is a view in section on an enlarged scale on the line 8—8 of Fig. 3.

1, and 2, represent the main planes of a biplane, and 3, 3, are the ailerons which are pivotally mounted in any approved manner, and are connected by wires 4 or other suitable flexible connecting devices with my improved automatic stabilizer which will now be described.

5, 5, represent cylinders located in alinement and connected by a receptacle 6 which is of the peculiar shape illustrated, that is to say, this receptacle 6 is of greatest diameter midway its ends, and at both ends tapers to and communicates with openings 7 in the ends of cylinders 5. Furthermore, the larger diameter of the receptacle 6 is in a lower plane than its tapering ends, so that this intermediate and larger portion of the receptacle is supported directly upon a bar 8 of the aeroplane as seen most clearly in Fig. 3. The cylinders 5, therefore, are in a higher plane and they are each provided with downwardly projecting bolts 9 which extend through openings 10 in bar 8, and have nuts 11 screwed onto their lower ends, clamping the bar 8 between said nuts and between annular flanges 12 on the bolts, so that the cylinders are secured rigidly to the frame. Each cylinder contains a piston 13, and each piston has a connecting rod which connects the piston with the lower end of a lever 15. The levers 15 are fulcrumed between their ends on brackets 16, and at their upper ends are connected to the flexible connecting devices 4. Brackets 16 have extension plates 17 which are provided with openings 18 adapted to register with openings 19 in the levers 15, so that any suitable locking device may be inserted through said openings to lock the levers against movement whenever it is desired to prevent the automatic equilibrium, and allow the manual operation of the ailerons. This is desirable where the airship is to be used for exhibition purposes, allowing the aviator to execute fancy movements in the air. The receptacle 6 contains liquid 20 preferably mercury, because of its high specific gravity.

By reason of the particular shape of the receptacle 6 when the airship is on an even keel, the level of the mercury will be in line with the lower walls of the cylinders 5, so that no mercury will be in the cylinders. The slightest tilt to right or left, however, will cause the mercury to run into the lower cylinder, and bear against the piston 13, forcing this piston outwardly and through the medium of lever 15 operate the aileron to automatically bring the airship to an even keel, when the mercury will flow back to its normal position. The mercury therefore, quickly responds to any incline to right or left, and by reason of its specific gravity, compels the movement of a piston to right the machine. Furthermore, by reason of the fact that the receptacle 6 is of greatest diameter between its ends, if the machine tilts forwardly or rearwardly, the mercury will flow into the front or rear portion of said receptacle without flowing into the cylinders. In other words, the receptacle 6, at the front and rear of the cylinders, is of sufficient internal diameter to accommodate all the mercury and hence allow the machine to tilt forwardly and rearwardly without operating either piston. As soon, however, as the machine tilts to right or left, the mercury will run into the cylinder, and move the piston.

While I have described my invention in connection with a particular type of aeroplane, I would have it understood that the invention may be utilized in connection with any form of aeroplane, and may operate any sort of equilibrium controlling mechanism on the airship so as to automatically stabilize. Furthermore, the invention is not limited to the particular details of construction set forth, but I consider myself at liberty to make such changes and alterations as fairly fall within the spirit and scope of the appended claims.

Having thus described my invention, what I claim as new and desire to secure by Letters Patent is:

1. An automatic stabilizer comprising a normally horizontal receptacle for liquid of greatest width intermediate its ends and having its ends in a higher plane than its intermediate portion, whereby the liquid in the receptacle will flow from the receptacle only when the latter is tilted longitudinally, horizontally positioned cylinders communicating at their ends with the ends of the receptacle, pistons in said cylinders and the liquid in said cylinders only when the receptacle is tilted longitudinally, substantially as described.

2. An automatic stabilizer comprising a normally horizontal receptacle having its ends reduced in diameter and extending in a higher plane than its intermediate portion, horizontally disposed cylinders communicating at their ends with the ends of the receptacle, pistons in said cylinders, and said receptacle of a width sufficient to accommodate all of the liquid therein when said receptacle is tilted transversely, whereby the liquid flows into the cylinders only when the receptacle is tilted longitudinally, substantially as described.

3. An automatic stabilizer comprising a receptacle for liquid of greatest width intermediate of its ends, having ends reduced in diameter and extending in a higher plane than the main portion of the receptacle, cylinders communicating with the reduced ends of said receptacle, pistons in said cylinders, brackets on the cylinders, flexible connecting devices secured to the upper ends of said levers and adapted to be connected to the stabilizing means of an airship, and connecting rods connecting the pistons with the lower ends of said levers, substantially as described.

4. An automatic stabilizer comprising a receptacle for liquid, cylinders communicating with the ends of said receptacles, pistons in said cylinders, brackets on the cylinders, flexible connecting devices secured to the upper ends of said levers and adapted to be connected to the stabilizing means of an airship, connecting rods connecting the pistons with the lower ends of said levers, extension plates on said brackets, and said plates and said levers having openings for the reception of locking means, substantially as described.

5. An automatic stabilizer comprising a receptacle for liquid of greatest width intermediate of its ends, having ends reduced in diameter and extending in a higher plane than the main portion of the receptacle, cylinders communicating with the reduced ends of said receptacle, pistons in said cylinders, brackets on the cylinders, flexible connecting devices secured to the upper ends of said levers and adapted to be connected to the stabilizing means of an airship, connecting rods connecting the pistons with the lower ends of said levers, extension plates on said brackets, and said plates and said levers having openings for the reception of locking means, substantially as described.

6. An automatic stabilizer comprising a receptacle for liquid of greatest diameter intermediate of its ends and having restricted ends inclining upwardly, a supporting bar on which the intermediate portion of said receptacle is positioned, cylinders located in a higher plane than the intermediate portion of said receptacle and communicating with the ends of the receptacle, pistons in said cylinders, bolts secured to said pistons and projected through the said bar, and nuts clamping said bolts in the bar, substantially as described.

In testimony whereof I have signed my name to this specification in the presence of two subscribing witnesses.

RALPH B. KOSKUL.

Witnesses:
R. H. KRENKEL,
CHAS. E. POTTS.